United States Patent [19]

Saiki et al.

[11] Patent Number: 5,953,513
[45] Date of Patent: Sep. 14, 1999

[54] RECORDING AND REPRODUCING DEVICE FOR RECORDING AND REPRODUCING INFORMATION FROM DIFFERENT KINDS OF STORAGE MEDIA HAVING DIFFERENT SECTOR FORMATS

[75] Inventors: Eisaku Saiki; Takashi Oeda; Shoichi Miyazawa, all of Yokohama; Kazuo Shigematsu, Yoshikawa-machi; Yasunori Kaneda, Yokohama, all of Japan

[73] Assignee: Hitachi, Ltd., Tokyo, Japan

[21] Appl. No.: 08/506,002

[22] Filed: Jul. 24, 1995

Related U.S. Application Data

[63] Continuation of application No. 08/087,892, Jul. 9, 1993, abandoned.

[30] Foreign Application Priority Data

Jul. 9, 1992 [JP] Japan .................................... 4-182396

[51] Int. Cl.⁶ ............................................ G06F 13/00
[52] U.S. Cl. ............................................ 395/500; 395/309
[58] Field of Search ..................................... 395/500, 309

[56] References Cited

U.S. PATENT DOCUMENTS

| | | | |
|---|---|---|---|
| 4,122,531 | 10/1978 | Tamaru et al. | 365/230.03 |
| 4,370,712 | 1/1983 | Johnson et al. | 711/201 |
| 4,400,793 | 8/1983 | Schuenemann | 711/160 |
| 4,534,013 | 8/1985 | Sheth | 395/825 |
| 4,558,429 | 12/1985 | Barlow et al. | 711/157 |
| 4,924,427 | 5/1990 | Savage et al. | 395/846 |
| 5,179,697 | 1/1993 | Nishii et al. | 705/20 |
| 5,185,694 | 2/1993 | Edenfield et al. | 395/287 |
| 5,410,676 | 4/1995 | Huang et al. | 395/500 |
| 5,455,926 | 10/1995 | Keele et al. | 711/4 |

OTHER PUBLICATIONS

*Newest SCSI Manual,* By CQ Publishing Co., Ltd., Jan. 1, 1989 pp. 146–147, 177.

*Primary Examiner*—Parshotam S. Lall
*Assistant Examiner*—Kenneth R. Coulter
*Attorney, Agent, or Firm*—Antonelli, Terry, Stout & Kraus, LLP

[57] ABSTRACT

The recording and reproducing apparatus comprises an Small Computer System Interface (SCSI) controller, an optical disc device, a magnetic disc device, a disc controller which controls the optical disc device and the magnetic disc device, connectors which connects directly the optical disc device and the magnetic disc device, and a selector which selects one of the optical disc device and the magnetic disc device. A Copy or Verify command is carried out within the apparatus without an SCSI bus, and data are transferred through the connector. Therefore occupation of the SCSI bus and overhead of the SCSI protocol are eliminated, and the apparatus is miniaturized by common use of the SCSI controller and the disc controller.

25 Claims, 15 Drawing Sheets

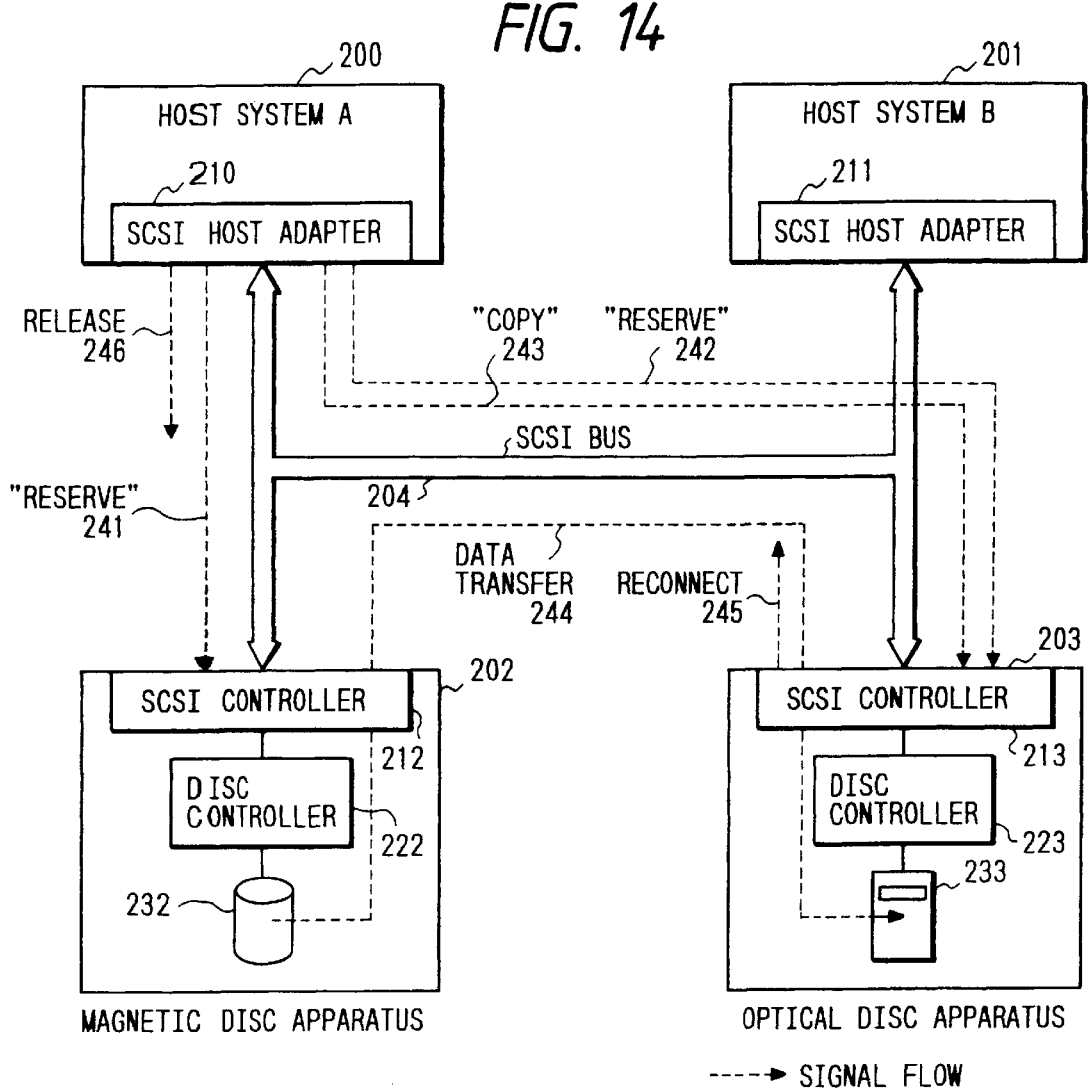
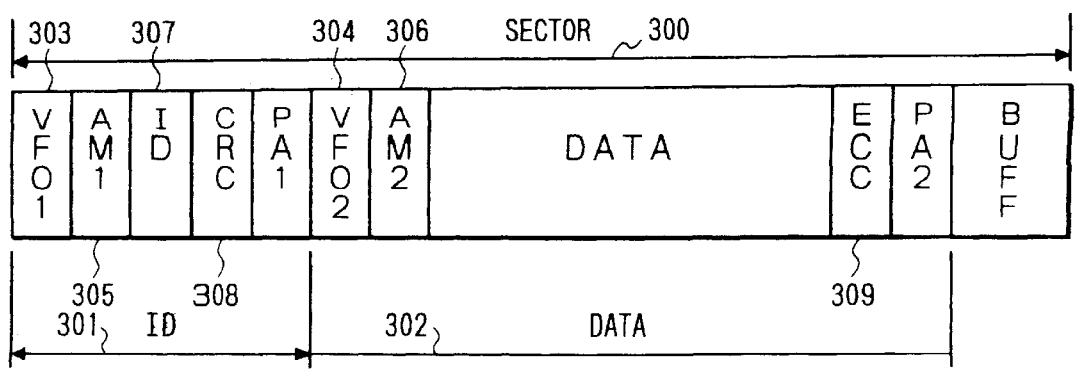

RECORDING AND REPRODUCING DEVICE FOR RECORDING AND REPRODUCING INFORMATION FROM DIFFERENT KINDS OF STORAGE MEDIA HAVING DIFFERENT SECTOR FORMATS

This application is a continuation of application Ser. No. 08/087,892, filed on Jul. 9, 1993 now abandoned.

BACKGROUND OF THE INVENTION

The present invention relates to a data storage apparatus and a computer system using recording media such as an optical disc apparatus or a magnetic disc apparatus, which are connected with an interface system.

In recent years, SCSI (Small Computer System Interface) is generally used as an interface for small-size computer systems. "Newest SCSI Manual" (published by CQ Publishing Co., Ltd., Jan. 1, 1989, pages 146–147, 177) provides a detailed description of the SCSI system. The SCSI is mainly connected to a host system (host computer) and an external memory such as a magnetic disc apparatus or an optical disc apparatus or a magnetic tape apparatus. Since the SCSI is operated by protocols, it is easy to connect and disconnect the host system and the external memory to and from the SCSI. That is, it has high expandability and versatility.

SCSI accepts eight apparatuses (including a host system) to be connected, and ID (identifier:identification number) of 0 to 7 is allocated to each apparatus. When the apparatuses connected to the SCSI are operated, they must be classified into an initiator (apparatus for issuing command) and a target (apparatus for receiving command). Generally, the host system is an initiator and the external memory is a target, and the external memory performs operations according to a command from the host system. However, the external memory may become an initiator, or the host system may become a target.

An example of the operation of a copy command (data copy) and its protocol for using the SCSI bus shall be described using FIG. 14. The copy command carries out data backup from a magnetic disc apparatus 202 which contains a SCSI controller 212 to a optical disc apparatus 203 which contains a SCSI controller 213. FIG. 14 shows the construction of an SCSI apparatus. The magnetic disc apparatus 202 and the optical disc apparatus 203 each include a disk controller 222, 223, and the SCSI controller of each is connected separately with a SCSI bus 204.

The operation of the copy command is as follows. First, a host system A 200 issues a reserve command 241 to the magnetic disc apparatus 202, and also issues a reserve command 242 to the optical disc apparatus 203, and inhibits access from another host system B 201. Next, the host system A 200 issues a copy command 243 to the optical disc apparatus 203. In this case, a copy command 243, assigns parameters including the ID of a data source and output destination apparatus, the LUN (Logical Unit Number), the top address and the copy block number on the magnetic disc 232, and the data block length of the optical disc 233. The optical disc apparatus 203 operates as an initiator after receiving the copy command 243 with the parameters.

Thereafter, the disc apparatus 202 reads out data from its magnetic disc 232, and carries out data transfer 244 to the optical disc apparatus 203 through the SCSI bus 204. The optical disc apparatus 203 writes the transferred data. When the data transfer 244 is finished, the optical disc apparatus 203 carries out reconnect processing 245 and informs of the completion of the copy command to the host system A 200. Then the host system A 200 releases the reserve state 246.

In above described operation, the conventional data storage apparatus has the following problems.

The execution of copy and verify (data comparison) commands through the SCSI bus occupies the SCSI bus for a long time, and it causes degradation of the system performance. Also large overhead of the SCSI protocol causes degradation of throughput in the SCSI apparatus.

In addition, miniaturization of the magnetic disc apparatus is occurring rapidly due to recent developments, and a problem occurs in that all circuits including the SCSI controller cannot be mounted within a miniaturized apparatus.

Also attendant on miniaturization of the optical disc apparatus or the magnetic disc apparatus, low consumption of power must be maintained.

Also since data transfer speed of the optical disc apparatus or the magnetic disc apparatus becomes high, read/write data signal must be treated in parallel as long as possible. Further, a transfer cable of read/write data signal must be shortened.

On the other hand, in a data storage apparatus such as an optical disc apparatus or a magnetic disc apparatus, it is quite important that the written data are read out correctly. Consequently, the important technical problem of the recording and reproducing is to secure the data reliability. Therefore the data reliability is improved by active introduction of error correction code ECC or the like. In this case, comparing reliability of the optical disc apparatus and the magnetic disc apparatus, the optical disc apparatus normally has a higher bit error rate. Consequently, in the optical disc apparatus, the ECC correction capability is strengthened in comparison with the magnetic disc apparatus.

In the optical disc apparatus, when the sector length is 1024 bytes, a Reed-Solomon code is used in the ECC thereby burst error of 80 bytes is made capable of being corrected. On the other hand, in the magnetic disc apparatus, a fire code has been used in the ECC , but a Reed-Solomon code (11 bytes) with high ECC capability is being adopted due to the use of high density recording. In this case, burst error of 2 bytes can be corrected.

The optical disc apparatus or the magnetic disc apparatus progressively higher density recording thus carrying the reproduction of read data to become more difficult. Specifically, due to high density recording, the read-out signal from the recording medium is miniaturized and made high speed and the S/N becomes lower. As a result, phase synchronization clocks to discriminate the read data and write clocks become high speed and the reproducing margin of the read data is decreased. Particularly, in the magnetic disc apparatus, since a gap between the head and the recording medium is decreased due to the high density recording, the contact probability between both becomes high and the bit error rate becomes high.

For this reason, the conventional data storage apparatus has another problem. Since the ECC capability of the magnetic disc apparatus is low in comparison with the optical disc apparatus, the read data error generating probability becomes high, and a serious problem is produced in that the error recovery cannot be made in the conventional system.

SUMMARY OF THE INVENTION

In view of the background, the first object of the present invention is to provide a data storage apparatus connected with an interface system where copy or verify is carried out without the interface system such as SCSI.

The second object is to use a circuit commonly connected between data storage apparatuses aiding in miniaturization of the total system.

The third object is to provide a data storage apparatus which can accept high data transfer speed.

The fourth object is to provide a data storage apparatus which consumes low power.

The fifth object is to provide a data storage apparatus which can handle large number of bit errors in a magnetic disc apparatus.

In order to attain the first, second and third objects, a data storage apparatus is provided which has at least two recording and reproducing devices using different types of recording mediums. Each of the recording and reproducing devices are controlled by same main controller. The main controller controls the direct transfer of write/read data between each of the recording and reproducing devices. In addition, it is preferable that one recording and reproducing device is an optical disc device and another recording and reproducing device is a magnetic disc device. An interface controller having an interface bus is also provided for supplying data to and from a host computer.

According to the above, the connection between the first and the second recording and reproducing devices through the main controller is used to perform copy or verify commands without the use of the interface controller. Therefore, occupation of the interface bus (the SCSI bus) and the overhead of the interface (SCSI) protocol is eliminated.

Common use of the interface controller and the main controller with the first and the second recording and reproducing devices permits the miniaturization of the circuit. In addition, the circuits of read/write signal processors, rotation controllers and head positioning controllers can also be mounted on one circuit board with the interface controller and the main controller.

Also the direct connection between the first and the second recording and reproducing devices permits decrease of loss due to a connection cable length and high speed data transfer. In addition, the read/write data between the first and the second recording and reproducing devices can be in parallel.

In order to attain the low consumption of power, the first and second recording and reproducing devices are set to the read, write, and seek state when the power source is turned on. If the first recording medium of the first recording and reproducing device (the optical disc device) is not inserted or, if no command is received within a prescribed time, rotation of the second recording medium (the magnetic disc) is stopped.

In order to accept an increase of bit error in the magnetic disc device, the magnetic disc is provided with a sector format having by plural pieces of ID information, and sync, resync codes, according to the optical disc sector format of the ISO (International Standardization Organization).

BRIEF DESCRIPTION OF THE DRAWINGS

The present invention will be more apparent from the following detailed description, when taken in conjunction with the accompanying drawings, in which:

FIG. 14 is a block diagram showing system constitution of the SCSI apparatuses in the prior art;

FIG. 15 is a diagram showing a sector format of a magnetic disc apparatus in the prior art.

DETAILED DESCRIPTION OF PREFERRED EMBODIMENTS

Embodiments of the present invention will be described referring to the accompanying drawings as follows.

Figure 1:
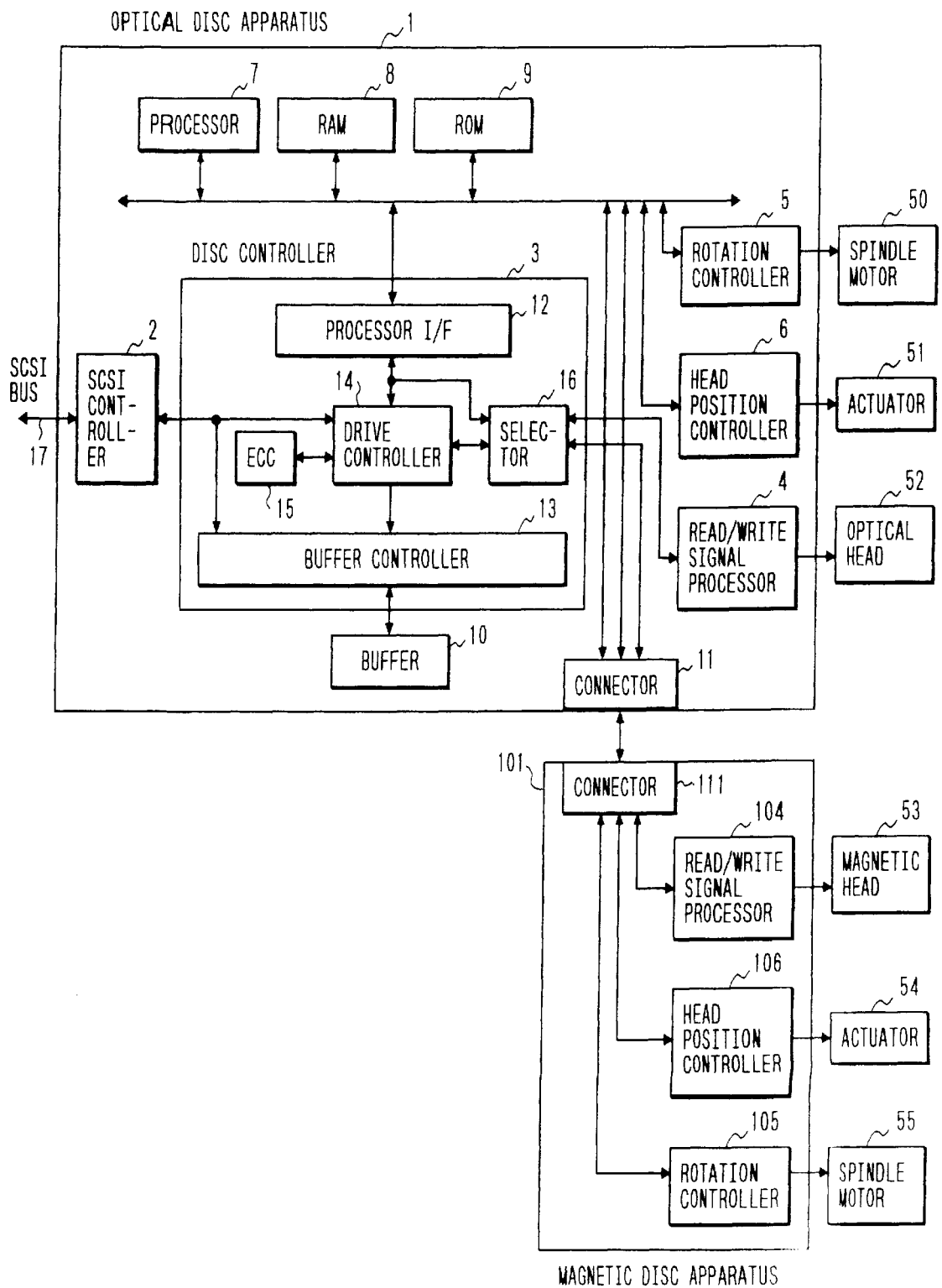
FIG. 1 is a block diagram of a data storage system according to the first embodiment.

FIG. 1 shows the first embodiment of the present invention. FIG. 1 is a block diagram of a data storage system comprising an optical disc apparatus 1 which contains an SCSI controller 2 and a magnetic disc apparatus 101.

The optical disc apparatus 1 comprises the SCSI controller 2 which is a system interface controller for delivering data to and from the host computer, a disc controller 3 for controlling read/write of data and operation of the apparatus, a read/write signal processor 4 for reading data from a recording medium and for writing data on a recording medium, a rotation controller 5 for controlling a motor 50 to rotate a recording medium constantly, a head position controller 6 for positioning an optical head by an actuator 51, a processor 7 for controlling the SCSI controller 2 and the disc controller 3, a RAM 8, a ROM 9, and a buffer 10 for storing the read/write data temporarily.

The disc controller 3 comprises a processor interface 12, a buffer controller 13, a drive controller 14, an Error Connection Circuit 15 and a selector 16. The processor interface 12 transfers data to and from the processor 7. The buffer controller 13 controls the buffer 10. The buffer 10 stores the read/write data to be transferred between the host system and either the magnetic disc apparatus 101 or the optical disc apparatus 1. The drive controller 14 controls reading and writing of data to and from the read/write processor 4 and the magnetic disc apparatus 101. ECC 15 carries out error correction using Error Correction Code (ECC) and Cyclic Redundancy Check (CRC). The disc controller 3 is also provided with a selector 16 which selects either the magnetic disc apparatus or the read/write signal processor 4. The optical disc apparatus 1 is also provided with a connector 11 which permits connection of the optical disc apparatus to the magnetic disc apparatus 101.

The magnetic disc apparatus 101 being connected to the optical disc apparatus 1 by a connector 111 which is connected to connector 11 comprises a read/write signal processor 104 for writing data to a recording medium and for reading data from the recording medium, a rotation controller 105 for controlling a motor 55 to rotate the recording medium constantly, and a head position controller 106 for positioning a magnetic head by an actuator 54. The magnetic disc apparatus 101 is also controlled by the disc controller 3 and the processor 7 in the optical disc apparatus 1.

Figure 16:
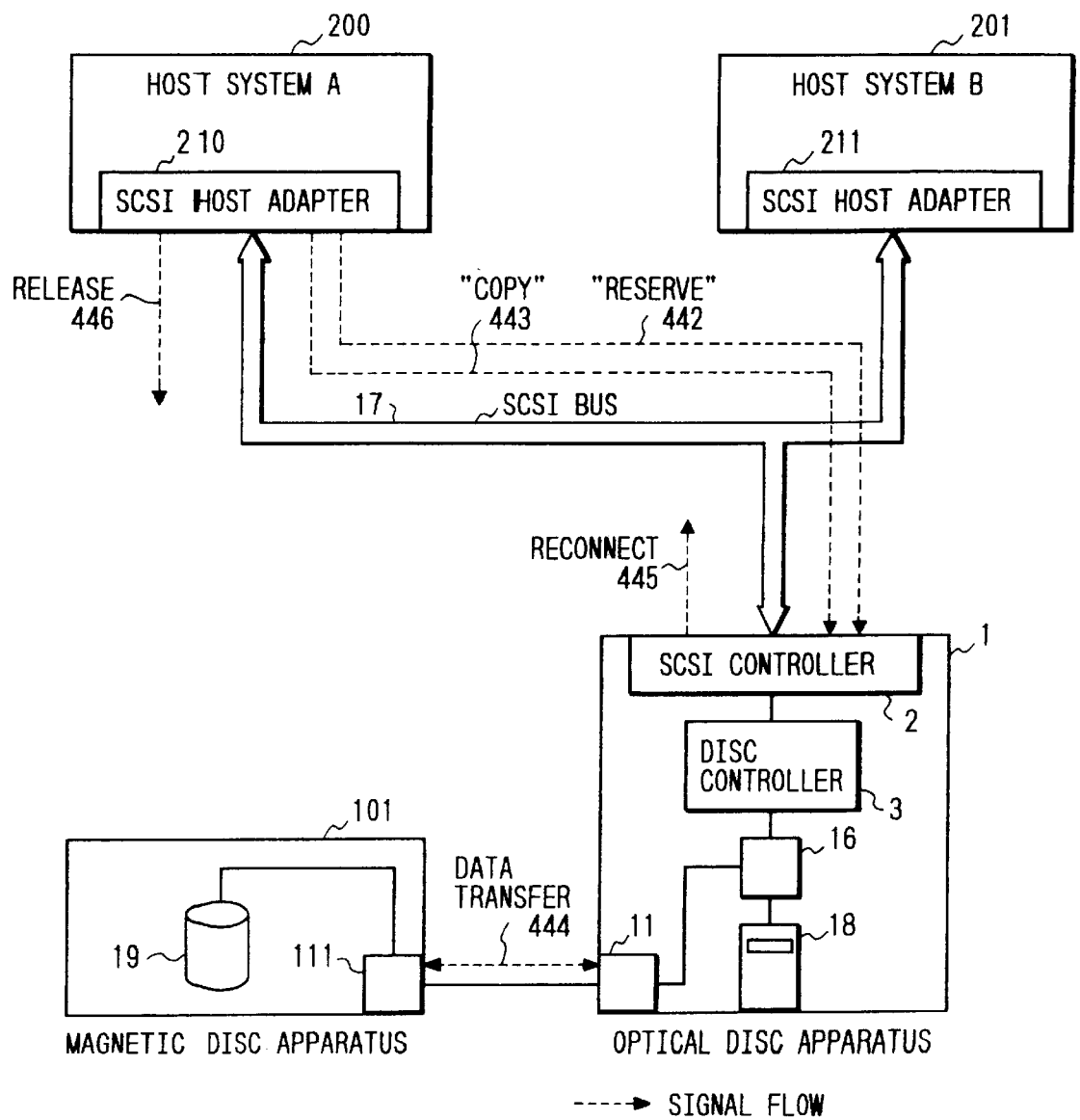
FIG. 16 is a block diagram showing system constitution of the SCSI apparatuses according to the first embodiment.

FIG. 16 shows a block diagram illustrating the operation of the data storage system using the present invention. The data storage system carries out data backup from the magnetic disc apparatus 101 to the optical disc apparatus 1 based on a command issued by the host computer in following manner. The host system A 200 which is connected with the SCSI bus 17 first issues a reserve command 442 to the optical disc apparatus 1, thereby inhibiting access from the other host systems (host system B 201). Next, the host system A 200 then issues a copy command 443 to the optical disc apparatus 1. The copy command includes parameters normally including the LUNs (logical Unit Number) indicating the magnetic disc apparatus 101, as a source and the optical disc apparatus 1 as a destination, the address of the top data block of the magnetic disc apparatus 101, the block number of the object to be copied, and the data block length of the optical disc apparatus 1.

The optical disc apparatus 1 receiving the copy command with the parameters disconnects the SCSI bus 17. And then the magnetic disc apparatus 101 is selected with the selector 16, and data indicated by the parameter of the copy command 443 is read from the magnetic disc apparatus 101 via connectors 11 and 111 and stored in buffer 10. Depending on the size of the buffer 10 and quantity of read data, the buffer 10 may only be capable of storing a portion of the read data. The remaining portion of the read data may be stored after the buffer 10 is emptied. After storing the data to the buffer 10, the optical disc apparatus 1 is selected with selector 16, and the data in the buffer 10 are written in an assigned area of the optical disc apparatus 1. Since the data is handled with a logical address, the data storage system needs to convert the logical address to a physical address. Therefore, different conversions are required by the optical disc apparatus 1 and the magnetic disc apparatus 101. When the data copy of assigned quantity (data transfer 244) is finished, the optical disc apparatus 1 carries out reconnect processing 445 of the SCSI bus and informs a status thereof indicating the completion of the copy command to the host system. The host system releases the reserve state (446).

According to the above described, since data can be transferred from the magnetic disc apparatus 101 to the optical disc apparatus 1 without the SCSI bus 17, the long occupation of the SCSI bus for the copy processing can be avoided. Also since the copy command is carried out without the SCSI controller 2, the overhead of the SCSI protocol can be avoided.

As understood from the above description when the magnetic disc apparatus 101 is selected with the selector 16, the optical disc apparatus can be used as a magnetic disc apparatus which contains an SCSI controller. Also when the optical disc apparatus 1 is selected with the selector 16, it can be used as a normal magnetic disc apparatus which contains an SCSI controller.

In an optical disc apparatus having a rewritable type optical disc, a data write operation is slow in comparison with a data read operation due to the data write operation also including an erase and a verify operations. Thus the data write operation takes three times more processing time in comparison with the data read operation. Consequently, in order to overcome the above noted deficiency, the data storage system of the invention, when writing data in the optical disc apparatus 1 is operated as follows. The data transferred from the host system A 200 or the host system B 201 through the SCSI bus 17 is once written into the magnetic disc apparatus 101 which has a fast data write operation, and then the data is transferred slowly to the optical disc apparatus 1 through the connectors 11 and 111. That is, the storage system can issue a command complete message and free the SCSI bus 17 when the data has been written only in the magnetic disc apparatus 101 as described above and before the data has been written in the optical disc apparatus 1. In this case, the magnetic disc apparatus 101 is used as a write buffer of the optical disc apparatus 1 to avoid the long occupying of the SCSI bus 17.

The interface system of the data storage system is not limited to the SCSI system. For example, PCMCIA Rev 2.0 (JEIDA 4.1) interface and IDE (Integrated Device Electronics) interface can be also used in the data storage system. Also the storage apparatuses of the data storage system is not limited to the combination of the optical disc apparatus containing the SCSI controller and the magnetic disc apparatus without it. It is also available to use a combination of a magnetic disc apparatus containing an SCSI controller and an optical disc apparatus without it. It is further possible to use a combination of a semiconductor disc apparatus and a magnetic disc apparatus or an optical disc apparatus. In this case, it is desirable to use the magnetic disc apparatus or the optical disc apparatus with an SCSI controller rather than use the semiconductor disc apparatus with an SCSI controller.

Figure 2:
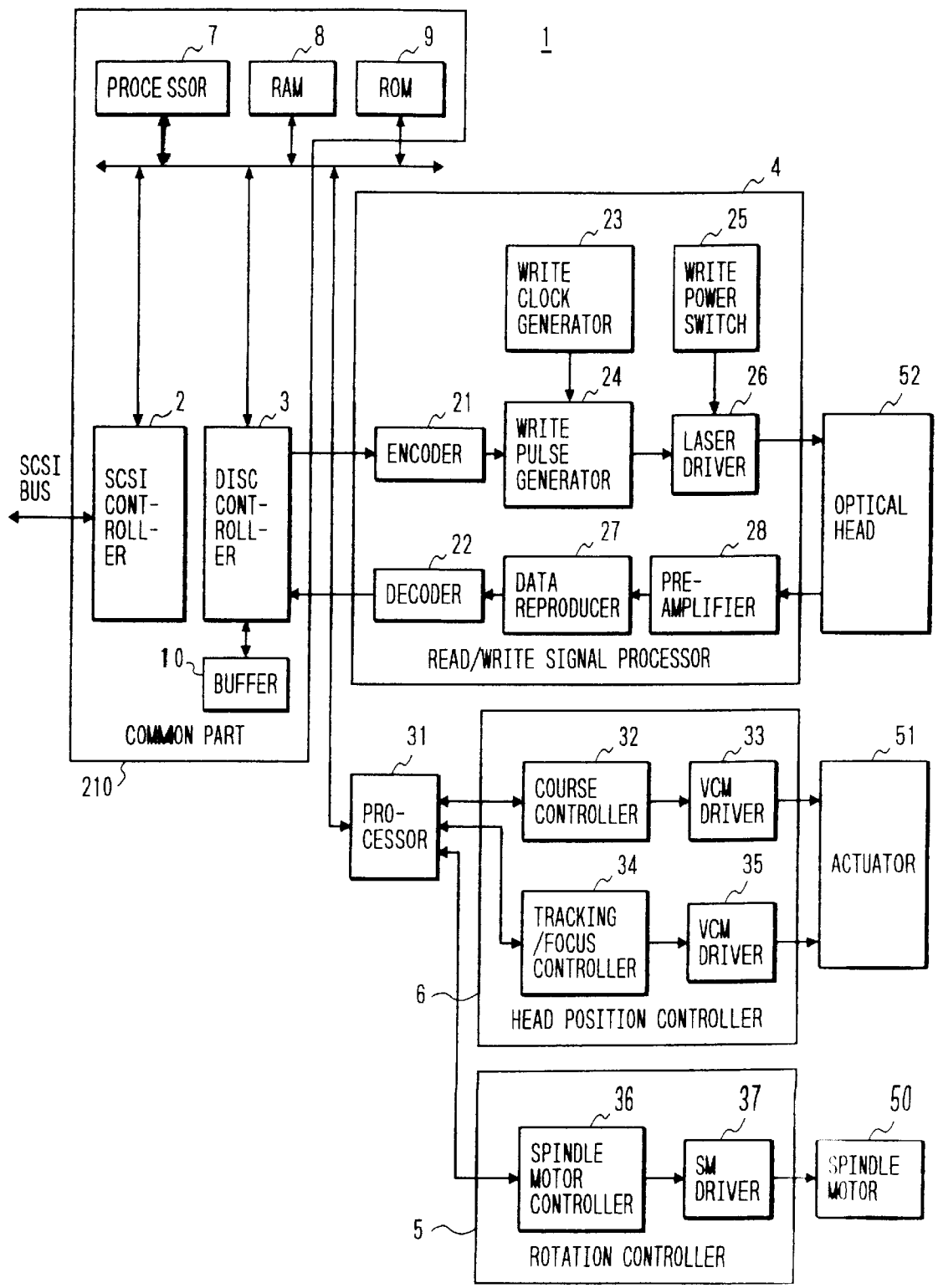
FIG. 2 is a block diagram of an optical disc apparatus in the data storage system.

FIG. 2 is a detailed block diagram of the optical disc apparatus 1 which contains the SCSI controller 2. In FIG. 2, the read/write signal processor 4 includes an encoder 21 for writing information to a recording medium, a write clock generator 23 for generating a write clock signal, a write pulse generator 24 for generating a write pulse signal from the encoded information and the write clock signal, a laser driver 26 for driving an optical head 52, a write power switch 25 for switching write power of the laser driver 26, a preamplifier 28 for reading information from a recording medium, a data reproducer 27 for reproducing data from the information read by the preamplifier 28, and a decoder 22 for decoding the data from the data reproducer 27. The head position controller 6 includes a course controller 32 for controlling an actuator 51 to move the optical head 52 to the intended position, a tracking/focus controller 34 for controlling the actuator 51 to keep tracking and focus, a VCM driver 33 for driving the actuator 51 according to signals from the course controller 32, and a VCM driver 35 for driving the actuator 51 according to signals from the tracking/focus controller 34. The rotation controller 5 includes a spindle motor controller 36 for controlling rotation of a spindle motor 50 loaded with a recording medium, and an SM driver 37 for driving the spindle motor 50 according to signals from the spindle motor controller 36. A processor 31 supervises and controls the head position controller 6 and the rotation controller 5. In addition, the SCSI controller 2, the disc controller 3, the processor 7, the RAM 8, the ROM 9 and the buffer 10 can be used commonly with the magnetic disc apparatus 101 as a common part 210.

Figure 3:
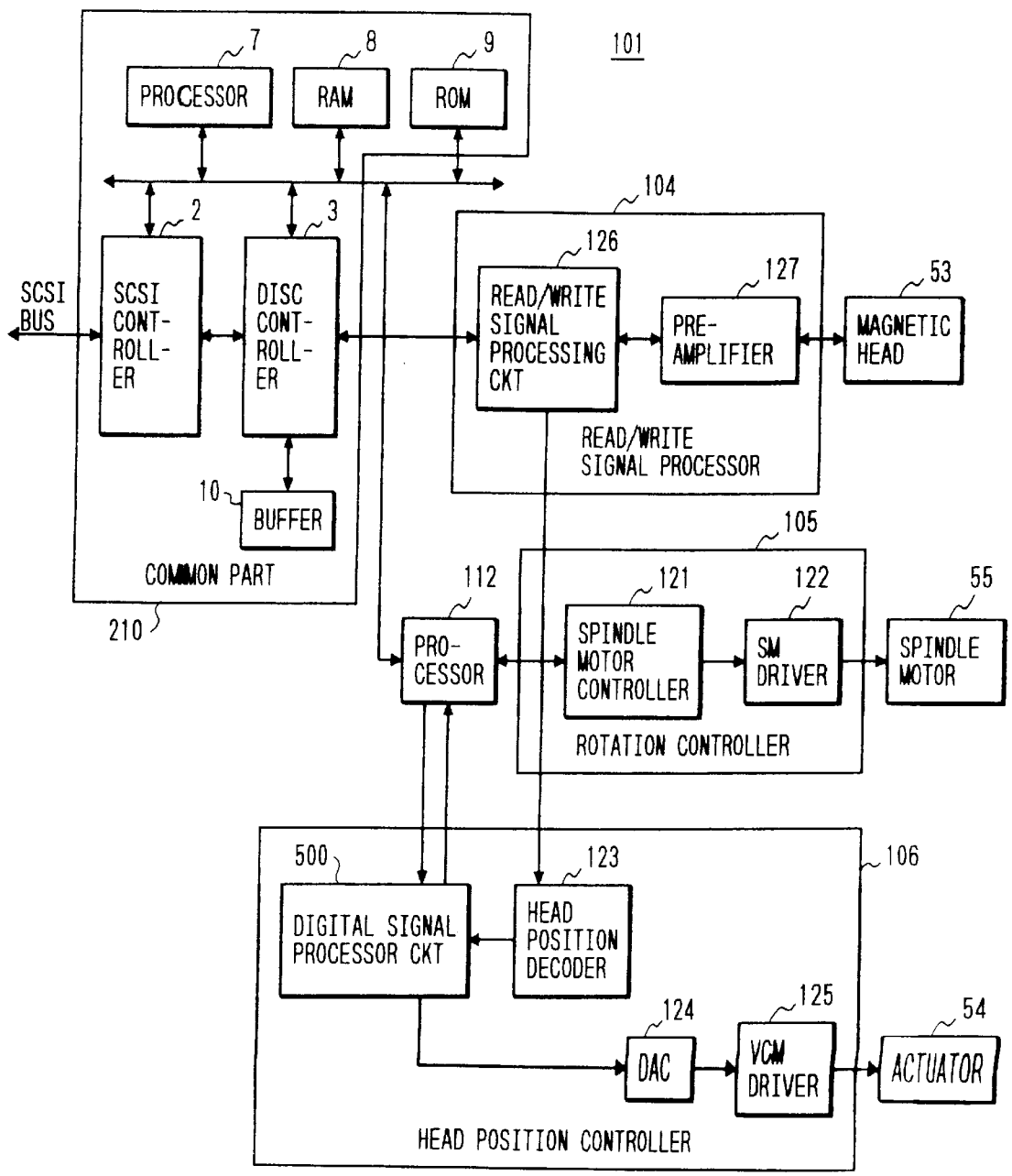
FIG. 3 is a block diagram of a magnetic disc apparatus in the data storage system.

FIG. 3 is a detailed block diagram of the magnetic disc apparatus 101 having the common part 210. In FIG. 3, the read/write signal processor 104 comprises a read/write signal processing circuit 126 for processing read signals from a magnetic head 53 and processing write signals to the magnetic head 53, and a preamplifier 127 for amplifying reading information from a recording medium. A rotation controller 105 comprises a spindle motor controller 121 for controlling rotation of a spindle motor 55 loaded with the recording medium, and an SM driver 122 for driving the spindle motor 55 according to signals from the spindle motor controller 121. A head position controller 106 comprises a digital signal power circuit 500, a head position decoder 123 for decoding head position data processed by the Read/write signal processing circuit 104, a DAC 124 for converting head position control data from a processor 112 to an analog signal, and a VCM driver 125 for driving the actuator 54 according to the signal from the DAC 124. The processor processes data from the spindle motor controller 121, the head position decoder 123 and common part 210, and send processed control data to the spindle motor controller 121 and DAC 124.

Figure 4:
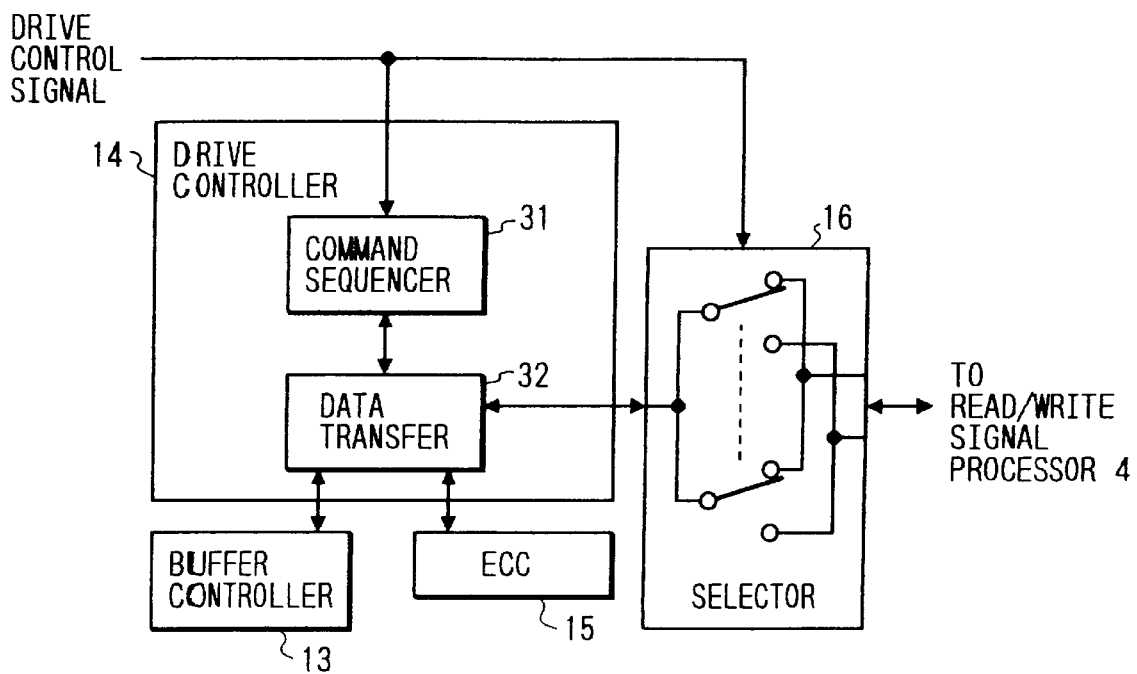
FIG. 4 is a block diagram of a drive control section in a disc controller.

FIG. 4 is a detailed block diagram of the drive controller 14 of the optical disk apparatus 1. The drive controller 14 controls the transfer of data between the read/write signal processor 4, the magnetic apparatus 101 and the buffer controller 13, and also controls reading/writing corresponding to disc format. In addition, the drive controller 14 is capable of changing disc format depending on the type of data storage system being used. The drive controller 14 comprises a command sequencer 31 which stores in corresponding relations commands and auxiliary commands and command sequences, and a data transfer circuit 32 which transfers data between the selector 16 and the buffer controller 13. In the drive controller 14, a command sequence is started by supplying a command or an auxiliary command corresponding to a desired command sequence to the command sequencer 31. The command sequencer starts the desired command in response to the command or auxiliary command. When a command sequence is being performed command signals are supplied to the data transfer circuit to control the operation thereof. The data transfer circuit 32 in response to the command signals transfers data between the selector 16 and buffer controller 13. Input and output read/write data signals in the data transfer circuit 32 are handled in parallel such as 8 bits to effect high speed transfer. For example, the drive controller 14 allocates respectively LUN:0 to the optical disc apparatus 1 and LUN:1 to the magnetic disc. A drive is selected with selector 16 by a drive control signal according to this information (LUN). The command sequencer 31 is capable of different command processing depending on a type of the storage apparatus being used.

Figure 5:
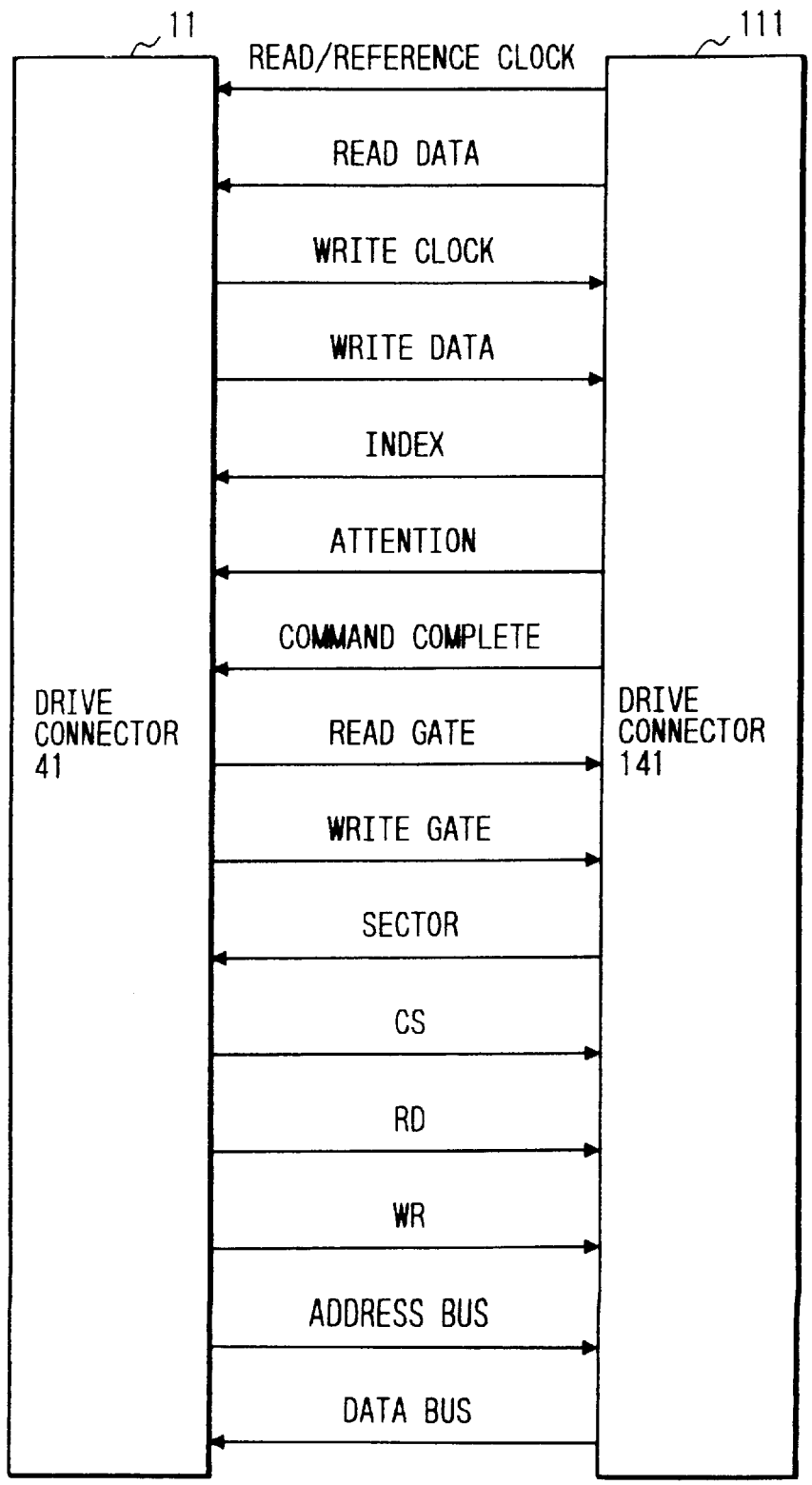
FIG. 5 is a diagram showing connection signals for connection between data storage apparatuses.

FIG. 5 shows an example of connection signals for the connection between the optical and magnetic disc apparatuses through connectors 11 and 111 respectively. The connectors 11 and 111 are made up of drive connector interface circuits 41 and 141 respectively each including a receiver for receiving signals and a driver for sending signals. READ/REFERENCE CLOCK provides a READ CLOCK signal synchronized with READ DATA when READ GATE is effective, and also READ/REFERENCE CLOCK provides a REFERENCE CLOCK signal when the READ GATE is not effective. READ DATA is data from a recording medium which is converted into NRZ format to be sent to the drive controller 14. WRITE CLOCK is a synchronizing signal for transferring WRITE DATA at WRITE state, and the WRITE DATA is data to be sent to the drive and written in a recording medium. INDEX is a timing pulse generated once a round of the recording medium, and indicates a data track and a start point. SECTOR is a timing signal indicating a start point of a sector. ATTENTION asserts when a error or change of status occurs. COMMAND COMPLETE is a status signal indicating completion of command, the READ GATE is a signal to read data from the recording medium, and WRITE GATE is a signal to write data to the recording medium. Power/GND lines are not shown in FIG. 5 but they are also included in the connection. CS, RD, WR, ADDRESS BUS and DATA BUS are provided for the data transfer between the apparatuses controlled by the processor 7. CS is a chip select signal, RD is a read signal, and WR is a write signal.

Figure 6:
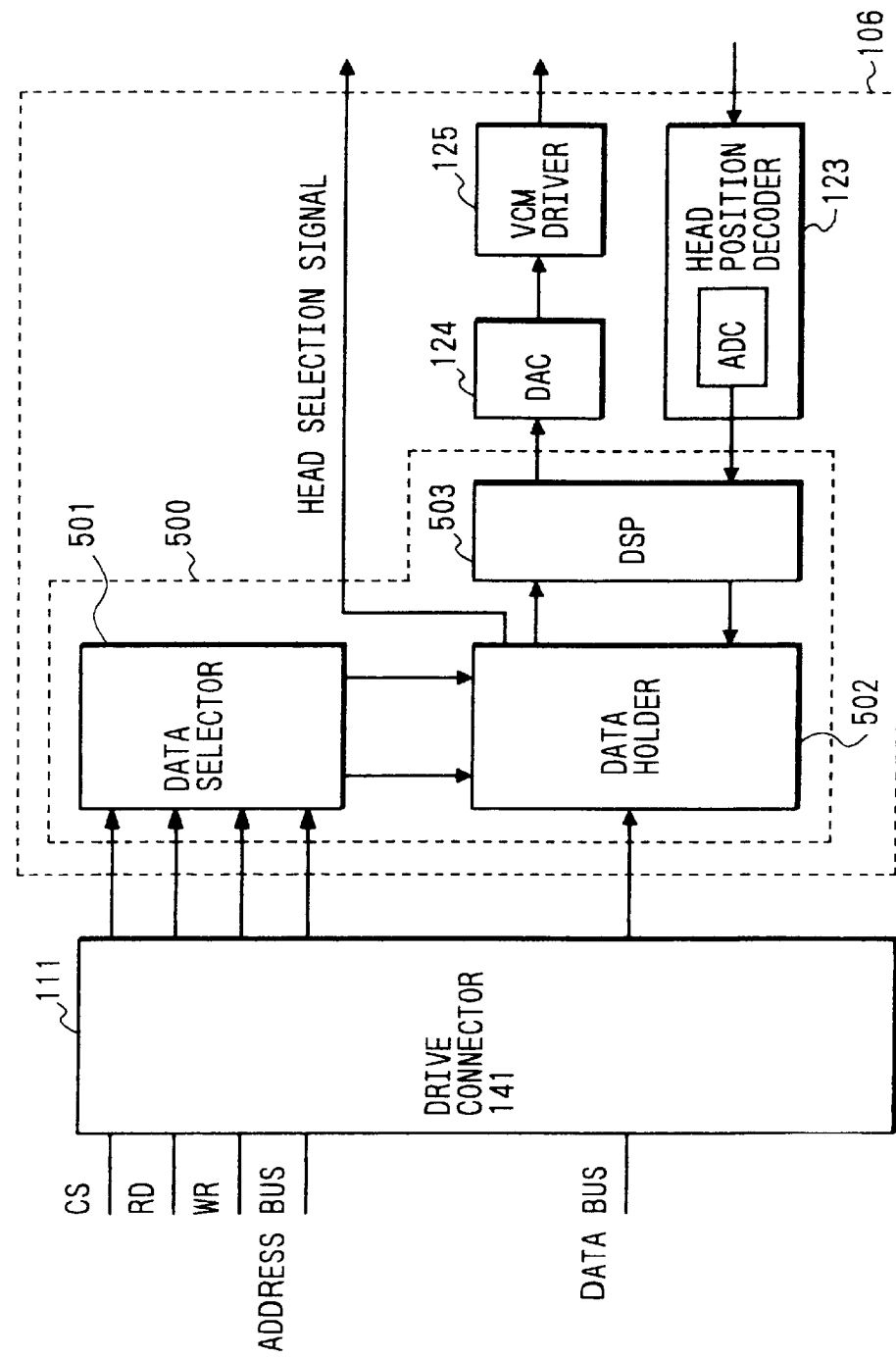
FIG. 6 and FIG. 7 are block diagrams of head position controllers in the magnetic disc apparatus of FIG. 3.
Figure 7:
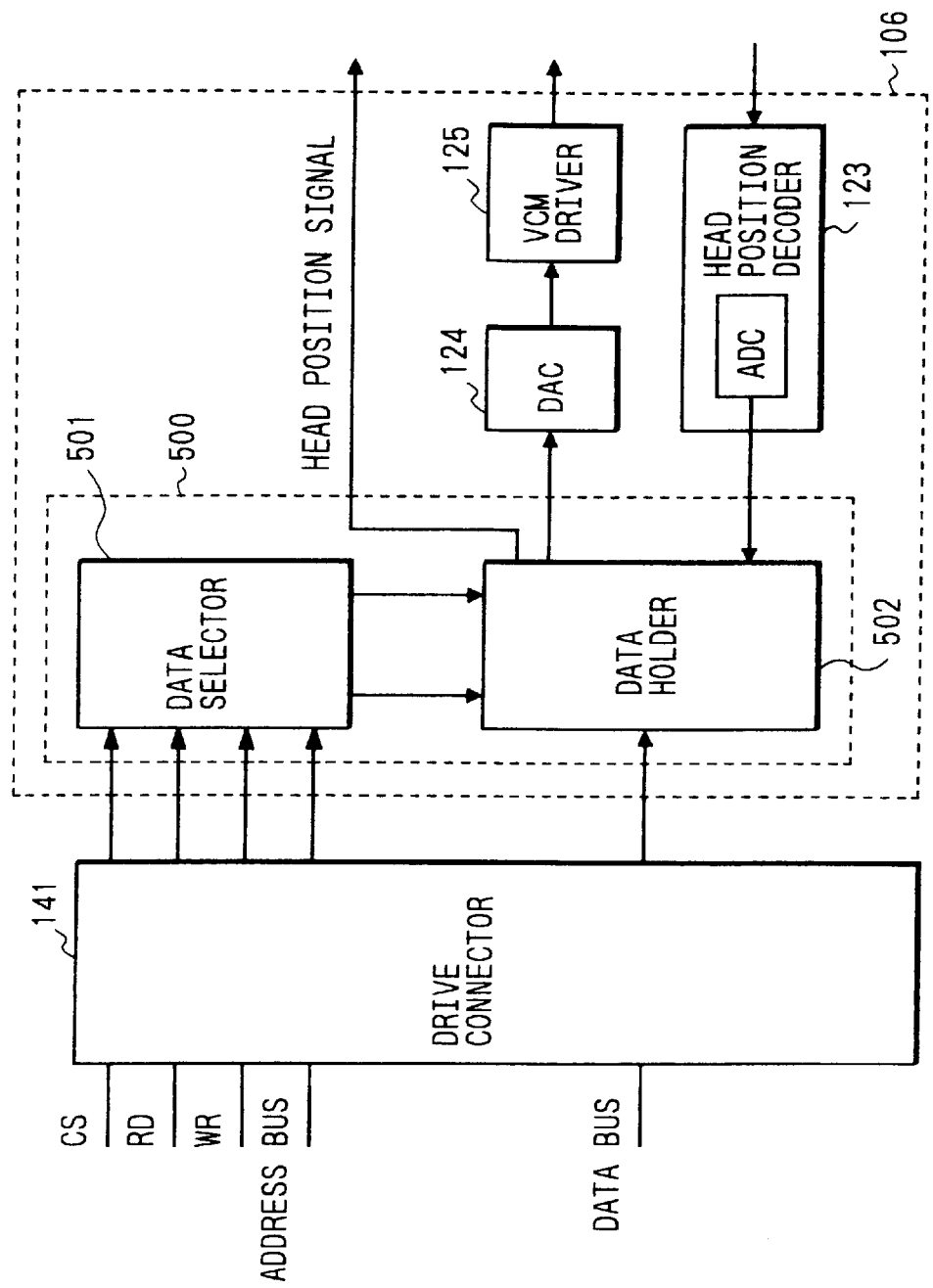

FIG. 6 and FIG. 7 are block diagrams of a portion of the magnetic disc apparatus for explaining the above connection. FIG. 6 specifically shows the head position controller 106 and the connector 111 of the magnetic disc apparatus 101. It is necessary to set the magnetic head 53 on intended position in order to read data from the magnetic disc apparatus 101 or write data in the magnetic disc apparatus 101. Therefore, cylinder information and head information for selecting a head from plural heads are required. These information is sent to the magnetic disc apparatus 101 with the control signals CS, RD, WR, along with signals on the address bus and the data bus. A data selector 501 selects a latch circuit in data holder 502 which is composed of latch circuits based on the control signals from CS, RD, WR, and signal on the address bus of the connector 111. For example of an 8 bits data bus, the cylinder information and the head information are sent in units of 8 bits to a plurality of 8 bits latch circuits. DSP (Digital Signal Processor) 503 calculates head movement information from the cylinder information stored in the data holder 502, and outputs results to the DAC (Digital/Analog Converter) 124. On the other hand, the head position decoder 123 detects current information of head position, and sends it to the DSP 503 through the ADC (Analog/Digital Converter) 124.

FIG. 7 also shows another type of the head position controller 106 which does not have a DSP. The processor 7 performs the functions of the DSP 503 of FIG. 6. The DATA BUS carries movement information of head, current information of head and selection information of head.

We explained the connectors 11, 111 as the connectors described in FIG. 5, however, it is not limited to them. It is necessary to provide a control signal, an address bus, a data bus and a power/GND at least.

Figure 8:
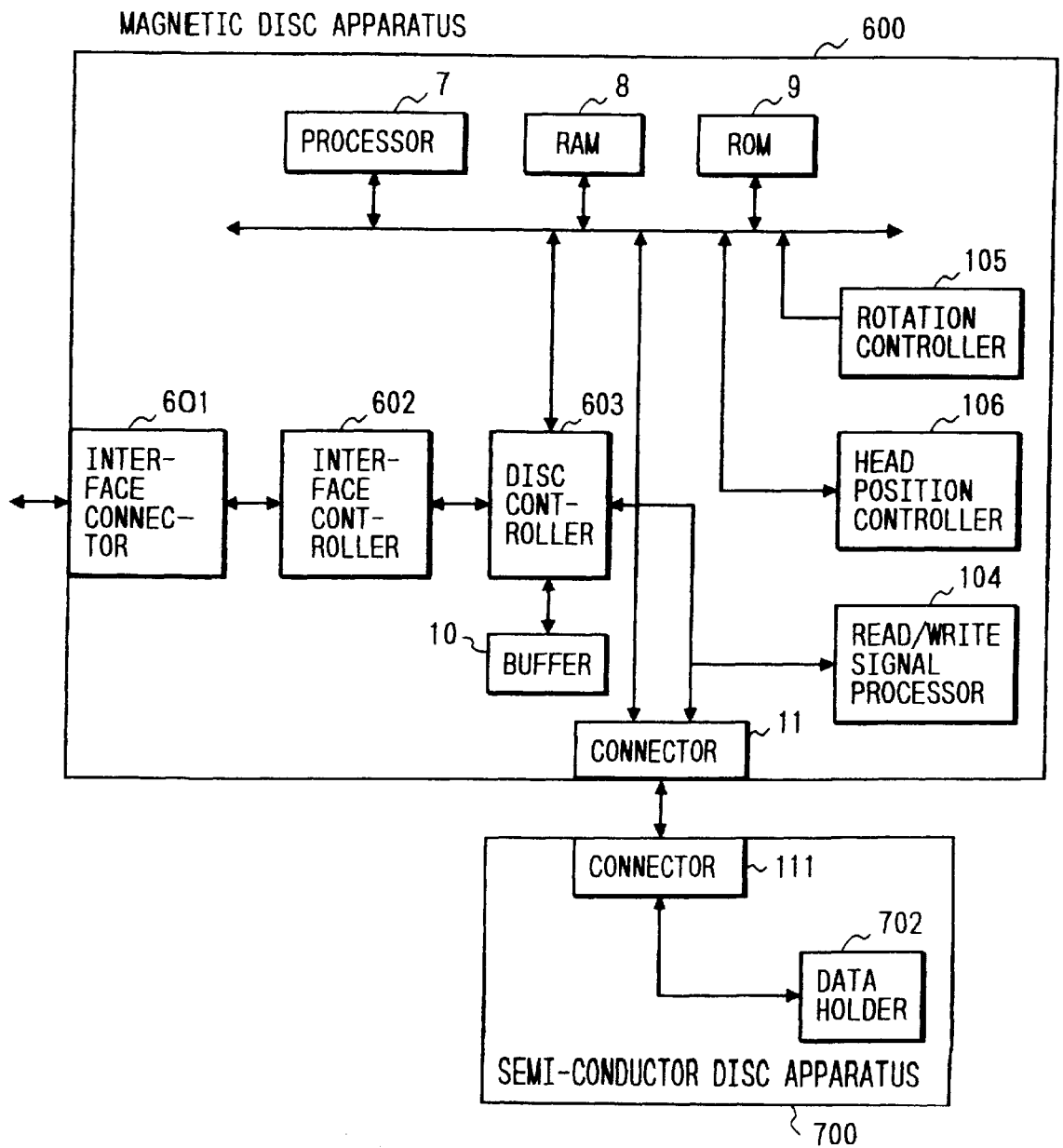
FIG. 8 and FIG. 9 are other block diagrams of a data storage system according to the first embodiment.

FIG. 8 shows another embodiment of the present invention, FIG. 8 is a block diagram of a data storage system which comprises a semiconductor disc apparatus 700 and a magnetic disc apparatus 600 containing an interface controller 601. It has a similar construction as the data storage system described in FIG. 1. The optical disc apparatus 1 corresponds to the magnetic disc apparatus 600, and the magnetic disc apparatus 101 corresponds to the semiconductor disc apparatus 700. A semiconductor disc apparatus is superior to a magnetic disc apparatus in data access speed, anti-vibration/shock ability, power consuming and portability. Therefore, this construction provides the benefits of a semiconductor disc apparatus.

The semiconductor disc apparatus 700 comprises the connector 111 for connecting the semiconductor disc apparatus 700 to the magnetic disc apparatus 600 and a data holder 702 made with a semiconductor memory for storing data. It is preferable to use non-volatile RAM (Random access Memory) as the memory of the semiconductor memory. Therefore, it is necessary to hold data with a refresh circuit in case of using DRAM (Dynamic RAM). Also it is preferable to use a battery backup function in case of using a DRAM or a SRAM (Static RAM). On the other hand, a EEPROM (Electrically Erasable and Programmable read Only Memory) can be also used. A flash EEPROM is regarded as a quasi unvolatile memory because it accepts electrical data rewriting in a byte unit and erasing in a block unit, therefore the flash EEPROM is suitable for an external memory device.

Data output from the data holder 702 and data input to the data holder 702 are sent by the control signals of connector 111 through the data bus. It is also usable with combination of an optical disc apparatus and a semiconductor disc apparatus. A disc controller 603 controls the read/write signal processor 104 and the semiconductor disc apparatus 700 as well as the disc controller 12. An interface controller delivers data to and from the host computer. An interface connector connects with an interface system, for example the SCSI.

Figure 9:
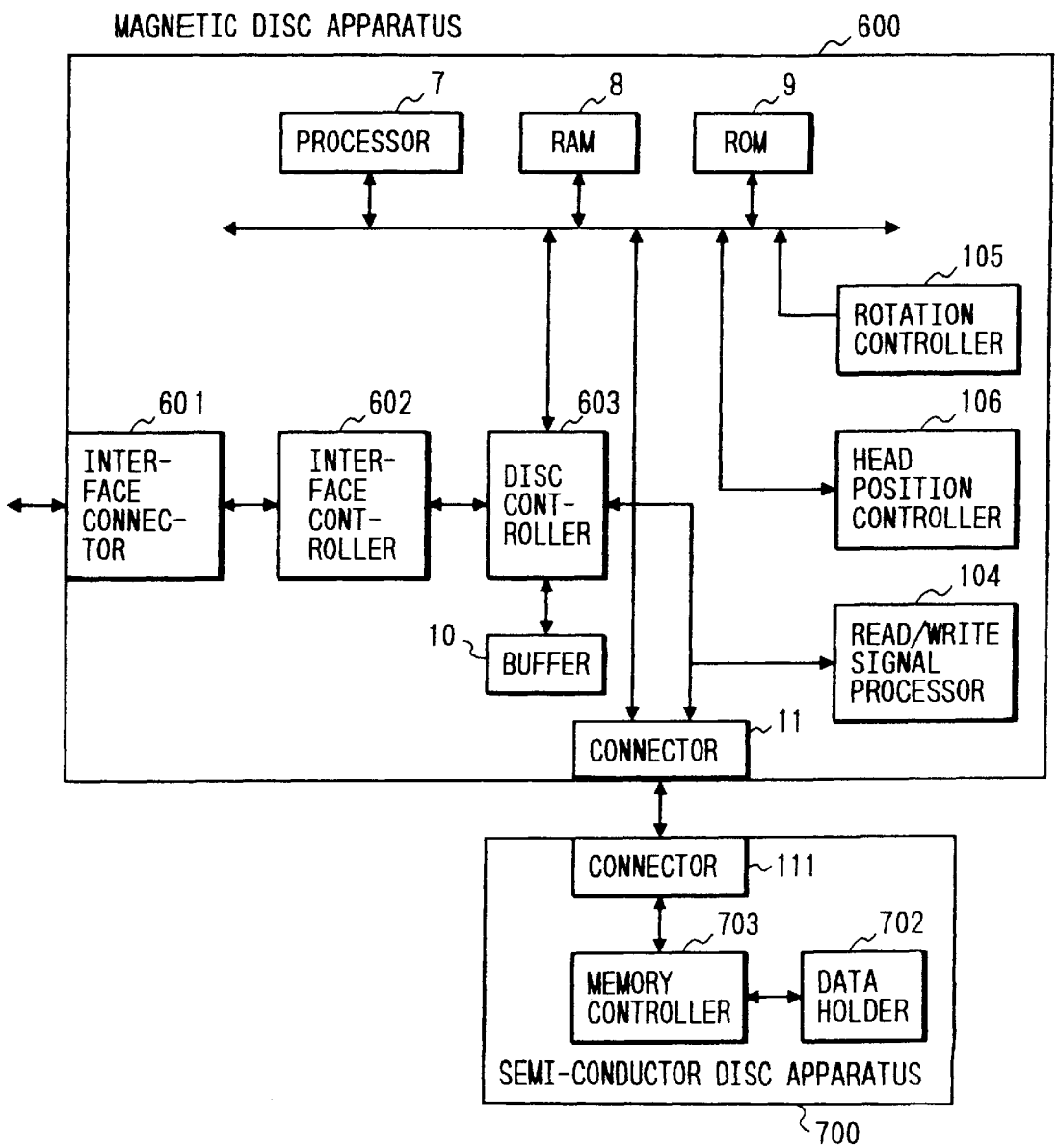

FIG. 9 also shows a block diagram of another embodiment of the present invention comprising the semiconductor disc apparatus and the magnetic disc apparatus. This construction has a memory controller 703. In this constitution, a connector 11 constituted with system interface including PCMCIA interface (PCMCIA-ATA) and IDE interface can be used. Therefore, the semiconductor disc apparatus 700 can provide a slot fitting with a IC card.

Figure 10:
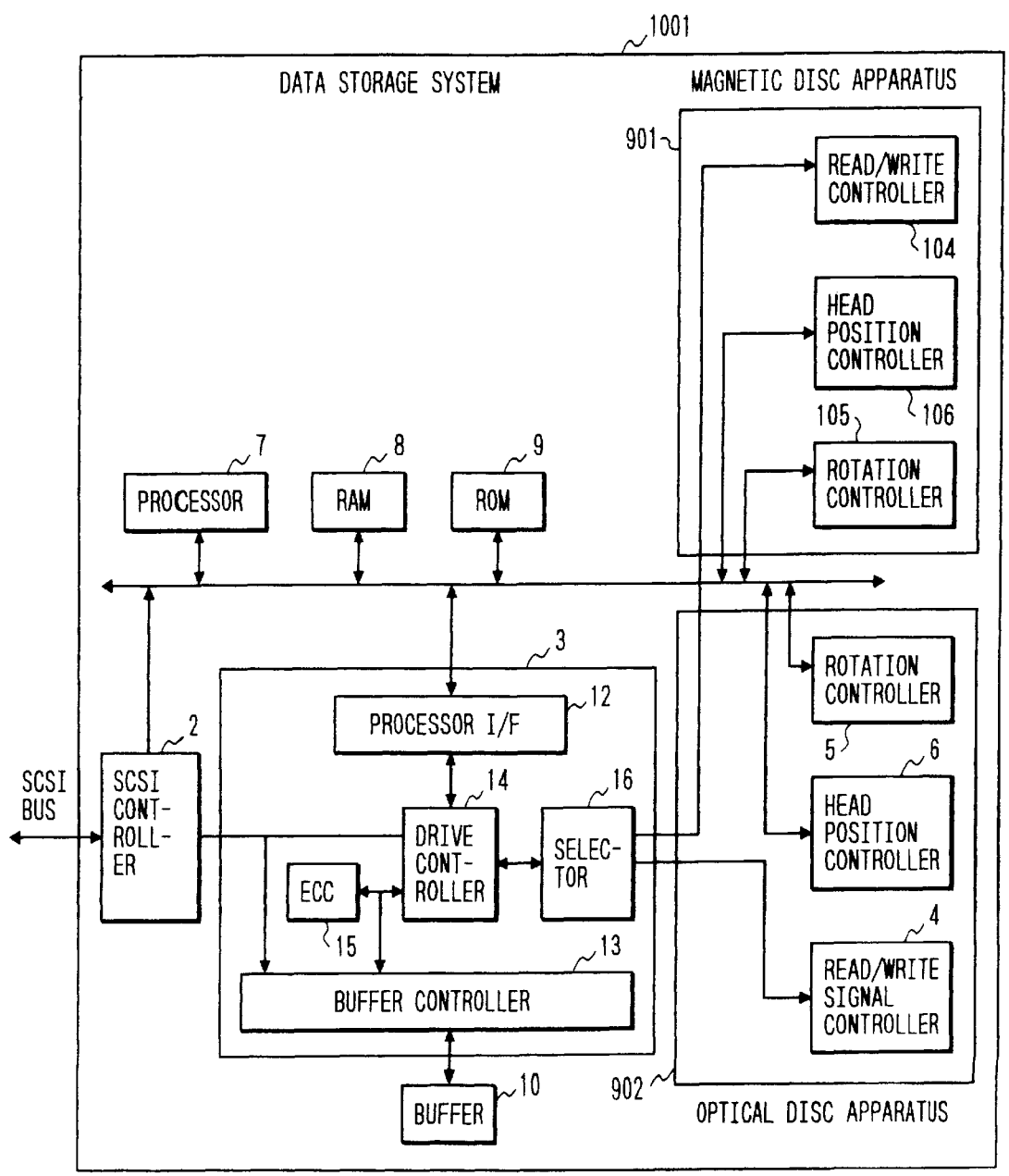
FIG. 10 is a block diagram of a data storage system according to the second embodiment.

FIG. 10 also shows a block diagram of another embodiment of the present invention which comprises an optical disc apparatus 902 and a magnetic disc apparatus 901 inside of a disc apparatus 1001. This data storage system is constructed without the connectors 11, 111 and a connection between the optical disc apparatus 1 and the magnetic disc apparatus 101 as illustrated in FIG. 1. Therefore, circuits of the read/write signal processor 104, the rotation controller 105 and the head position controller 106 of the magnetic disc apparatus 901 are integrally on a main substrate with circuits of the SCSI controller 2, the disc controller 3, the processor 7, the RAM 8, the ROM 9 and the optical disc apparatus including the read/write signal processor 4, the rotation controller 5 and the head position controller 6.

This construction is superior in signal transmission loss and miniaturization of the apparatus because the connection between the optical disc apparatus 902 and the magnetic disc apparatus 901 is made without connectors and a connection therebetween. It is also possible to use a combination of a magnetic disc apparatus and a semiconductor disc apparatus or a combination of an optical disc apparatus and a semiconductor, disc apparatus.

Figure 11:
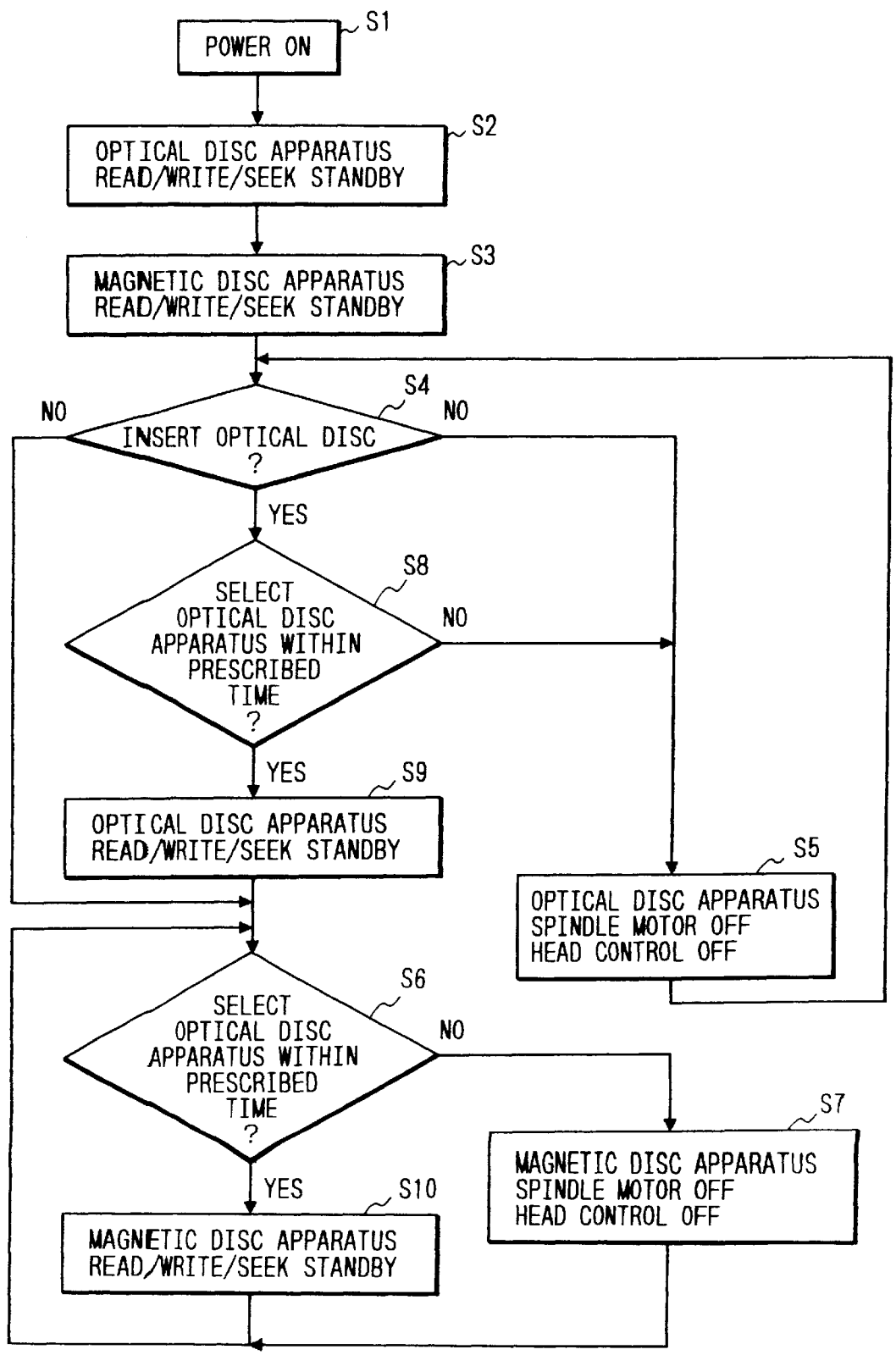
FIG. 11 is a flow chart showing operation procedure of the data storage system.

FIG. 11 is a flow chart explaining operation mode in the system made of a combination of the magnetic disc apparatus 1 and the optical disc apparatus 101 illustrated in FIG. 1.

At first, the power source is turned on to the optical disc apparatus 1 and the magnetic disc apparatus 101 (S1), and then the optical disc apparatus 1 and the magnetic disc apparatus 101 is set for standby state which enable to read data, write data, seek (move a head) (S2, S3). This state means that the read/write signal processor 104 (4), the rotation controller 105 (5), the head position controller 106 (6) are in action, and the spindle motor 55 (50) which rotates the recording medium and the head position controlling are also in ON state. It is also possible to set the magnetic disc apparatus 101 for standby state simultaneously with the optical disc apparatus 1.

Next, insertion of a recording medium in the optical disc apparatus 1 is detected (S4). If no recording medium is inserted, the optical disc apparatus 1 is set for sleep state which means that the spindle motor 50 and the head controlling are turned off (S5), and insertion of the recording medium is awaited. At the same time, selection and access in the magnetic disc apparatus 101 which are carried out within a prescribed time are checked (S6). If there is no selection or access, the spindle motor 55 of the magnetic disc apparatus 101 and the head controlling are turned off (S7). If a recording medium is inserted in the optical disc apparatus 1, selection and access in the optical disc apparatus 1 which are carried out within a prescribed time are checked (S8). The standby state is held in case of the selection or the access carrying out (S9). The standby state is held in the magnetic disc apparatus 101 in case of the selection or the access carrying out.

These ON/OFF control of the spindle motor and the head controlling depending on the insertion of the recording medium, the selection and access are effective to keep low power consumption.

FIG. 15 shows sector format of a magnetic disc apparatus in the prior art. One sector 300 is constituted by an ID section 301 and a DATA section 302. VFO1 303 VFO2 304 indicate domains for generating clocks to read data, and AM1 305 and AM2 306 indicate data reading-out start positions. Information such as cylinder number, head number, sector number is written to ID 307. An error detection code is written to CRC (Cyclic Redundancy Check) 308. ECC 309 is written to one position in one sector 300.

Figure 12:
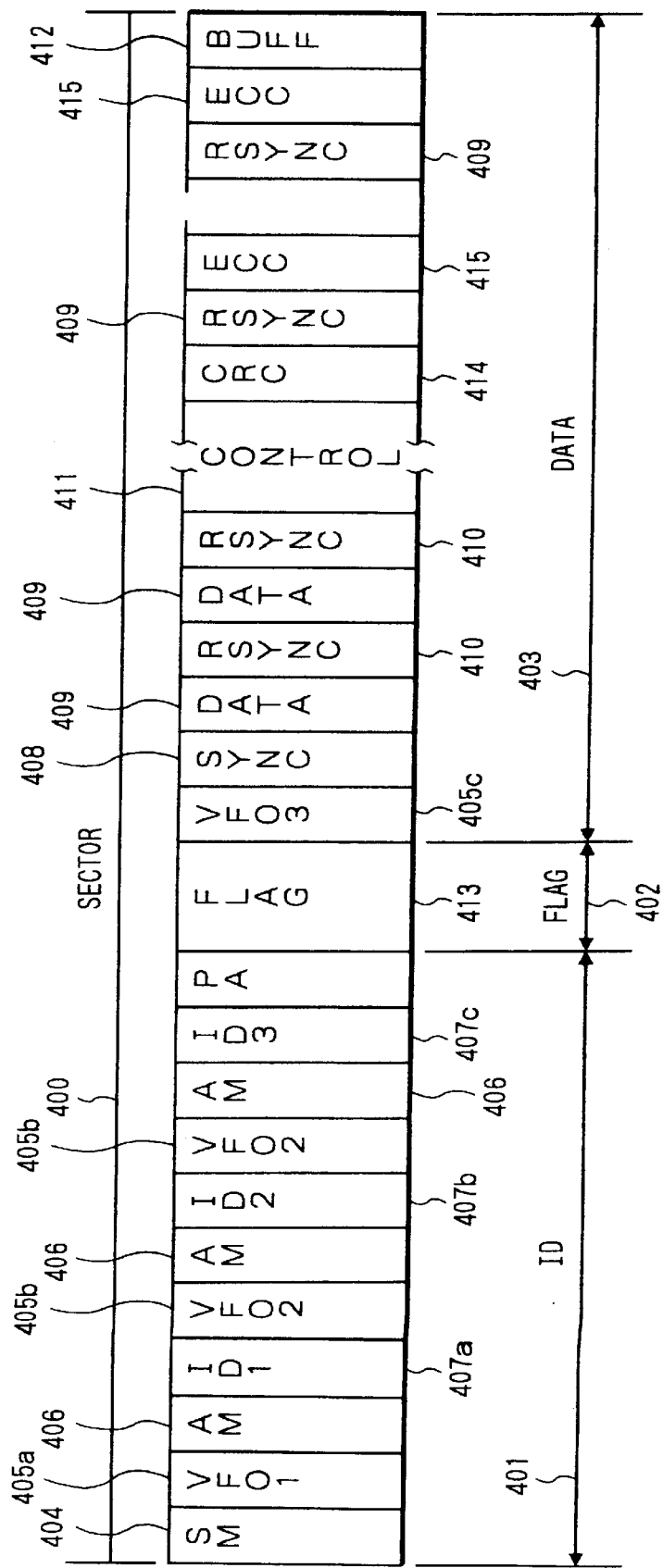
FIG. 12 is a diagram showing sector format of the magnetic disc apparatus.

FIG. 12 shows sector format of the magnetic disc apparatus 101 in the data storage system of the present invention. One sector 400 is constituted by an ID section 401, a flag section 402 and a DATA section 403, and is basically corresponding to sector format of the optical disc apparatus 1. For example, it is nearly the same as the sector format of the 5.25-inch optical disc apparatus based on the ISO.

SM 404 indicates the top of the sector format. VFO 1, 2, 3 (405a, 405b, 40c) indicate domains for generating clocks to read data, and AM 406 indicates the data reading start position. Cylinder number, head number, sector number and CRC are written to ID 1, 2, 3 (407a, 407b, 407c). Wrong sector information or the like being history of the sector 400 is written to the flag section 402. SYNC 408 is a special pattern code similar to that of the AM 406, and indicates the start point of DATA 409. RSYNC 410 being a resync code uses a special pattern code for synchronization to prevent cascading of data error to synchronization deviation of reading-out clocks generated due to data lacking or the like. CONTROL 411 is provided to carry out the alternate processing. BUFF 412 serves not to break the top of next sector even if the rotation variation occurs in the recording medium. Plural pieces of ID information 407a, 407b, 407c are arranged so that reading is carried out securely without error even if one piece of the ID information is lacking. Also plural pieces of the FLAG 413 are preferably written. Resync code RSYNC 410 is inserted intermittently in the DATA section 403. As a result, even if data lacking or the like occurs, the correct reading-out clock can be obtained. Numeral 414 designates CRC, and numeral 415 designates ECC.

Figure 13:
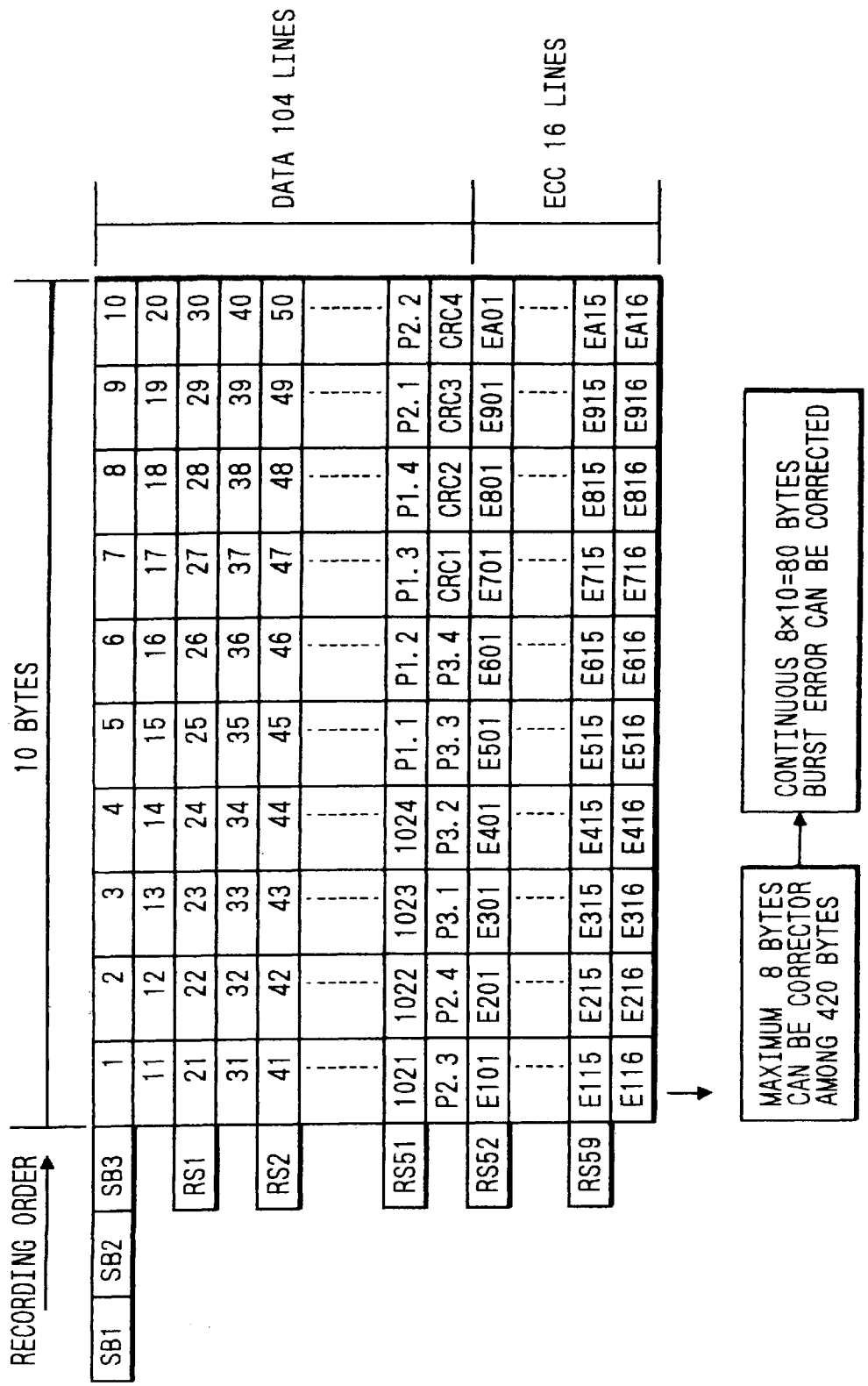
FIG. 13 is a diagram showing data format for a 1024-byte sector of the magnetic disc apparatus.

FIG. 13 shows data format in the case that the sector length is 1024 bytes. A Reed-Solomon code is used in ECC 415 and interleaving is applied. SB designates sync and RS designates resync, and ECC 415 of 16 bytes is added to data of 104 bytes. In this case, burst error of 80 bytes can be corrected. Since the interleaving is carried out, the burst error is distributed and is converted into bits or word unit. Consequently, the long burst error can be corrected.

In the magnetic disk apparatus, the high density recording is further advanced since now, and quality of reading-out signal is degraded and the bit error rate becomes high. Moreover, since the floating quantity of head becomes small, probability of head crash becomes high and the burst error is increased. Therefore the correcting capability of ECC is elevated thereby the read error is reduced and the high density recording can be attained.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A data storage apparatus for transferring data between a plurality of recording and reproducing devices having different recording formats, comprising:

a first recording and reproducing device for recording/reproducing write/read data on/from a first recording medium having a first recording format;

a second recording and reproducing device for recording/reproducing the write/read data on/from a second recording medium having a second recording format different from said first recording format, said second recording and reproducing device being different from said first recording and reproducing device;

an interface controller for delivering the write/read data to a host computer in a logical address form; and a main controller for transferring data with format conversion between said first recording and reproducing device recording data having said first recording format and said interface controller, and for directly transferring data with format conversion between said first recording and reproducing device recording data having said first recording format and said second recording and reproducing device recording data having said second recording format different from said first recording format.

2. A data storage apparatus according to claim 1, wherein said first recording and reproducing device is an optical disc device, and said second recording and reproducing device is a magnetic disc device.

3. A data storage apparatus according to claim 2, wherein said main controller sets said optical disc device on read/write/seek state when the power is turned on, and stops rotation in said optical disc device when said main controller has received no command or no recording medium has been inserted in a prescribed time.

4. A Data storage apparatus according to claim 2, wherein said second recording format of said second recording medium of said magnetic disc device includes plural pieces of Identification (ID) information, Synchronizing (SYNC) codes and Phase Synchronizing (RESYNC) codes according to sector format based on the International Standardization Origination (ISO).

5. A data storage apparatus according to claim 1 wherein said first recording and reproducing device is a magnetic disc device, and said second recording and reproducing device is a semiconductor disc apparatus.

6. A data storage apparatus according to claim 1, wherein said first recording and reproducing device is an optical disc device, and said second recording and reproducing device is a semiconductor disc apparatus.

7. A data storage apparatus according to claim 6, wherein said main controller sets said optical disc device on read/write/seek state when the power is turned on, and stops rotation in said optical disc device when said main controller has received no command or no recording medium has been inserted in a prescribed time.

8. A data storage apparatus according to claim 1, wherein said main controller is a disc controller which also controls reading and writing in said first and second recording and reproducing devices.

9. A data storage apparatus according to claim 1, wherein the circuits of said first recording and reproducing device, said second recording and reproducing device, said interface controller and said main controller are mounted on one circuit board.

10. A data storage apparatus according to claim 1, further comprising a selector which selects one of said first and second recording and reproducing devices to be used under control of said main controller.

11. A data storage apparatus according to claim 1, wherein said first and second recording and reproducing device have read/write signal processors for processing read/write data from/to the first and second recording mediums, rotation controllers for controlling motors to rotate the first and second recording mediums, and a head position controller for controlling positioning of recording/reproducing heads.

12. A data storage apparatus according to claim 1, further comprising:

connectors which connect said first recording and reproducing device with said second recording and reproducing device, wherein the circuits of said first recording and reproducing device, said interface controller and said main controller are mounted on one circuit board.

13. A data storage apparatus according to claim 12, wherein said connectors have connection for a control signal, an address bus, data bus and a power source.

14. A method for transferring data between a plurality of recording and reproducing devices having different recording formats, the data being received/delivered from/to a host computer through an interface system, said method comprising the steps of:

receiving/delivering data from/to the host computer through the interface system in a logical address form;

a storing/reading the data on/from a first disc storage device having a first recording format;

storing/reading the data on/from a second disc storage having a second recording format different from said first recording format, said second disc storage device being different from said first disc storage device; and transferring the data with format conversion between said first recording and reproducing device recording data having said first recording format and said interface controller, and for directly transferring data with format conversion between said first disc storage device recording data having said first recording format and said second disc storage device recording data having said second recording format different from the first recording format.

15. A method according to claim 14, wherein the first disc storage device is an optical disc device and the second disc storage device is a magnetic disc device.

16. A method according to claim 15, wherein the data are stored in the magnetic disc device according to said second recording format by writing the data on a magnetic disc with a sector format including plural pieces of ID information, SYNC codes and RESYNC codes based on the ISO.

17. A method according to claim 14, wherein the first disc storage device is a magnetic disc device and said second disc storage device is a semiconductor disc device.

18. A method according to claim 14, wherein the first disc storage device is an optical disc device and a second disc storage device is a semiconductor disc device.

19. A method according to claim 14, further comprising the step of:

issuing to the host computer from the interface system a command complete message after received data have been stored in the second disc storage device and before transferred data have been stored in the first disc storage device.

20. A data storage apparatus for transferring data between a plurality of recording and reproducing devices having different recording formats, comprising:

a first recording and reproducing device for recording/reproducing write/read data on/from a first recording medium having a first recording format;

a second recording and reproducing device for recording/reproducing the write/read data on/from a second recording medium having a second recording format different from said first recording format, said second recording and reproducing device being different from said first recording and reproducing device, said second recording and reproducing device has a faster writing speed than the first recording and reproducing device;

an interface controller for delivering the write/read data to a host computer in a logical address form; and a main controller for transferring data with format conversion between said first recording and reproducing device recording data having said first recording format and said interface controller, and for directly transferring data with format conversion between said first recording and reproducing device recording data having said first recording format and said second recording and reproducing device recording data having said second recording format different from said first recording format wherein said main controller when storing data in said first recording and reproducing device, receives data from the host computer through said interface controller, stores the received data in the second recording and reproducing device, transfers the data in said second recording and reproducing device to said first recording and reproducing device, and stores the transferred data in said first recording and reproducing device.

21. A data storage apparatus according to claim 20, wherein the first recording and reproducing device is an optical disc device and said second recording and reproducing device is a magnetic disc device.

22. A data storage apparatus according to claim 21, wherein the received data are stored in the magnetic disc device according to said second recording format by writing the received data on a magnetic disc with a sector format including plural pieces of ID information, SYNC codes and RESYNC codes based on the ISO.

23. A data storage apparatus according to claim 20, wherein the first recording and reproducing device is a magnetic disc device and said second recording and reproducing device is a semiconductor disc device.

24. A data storage apparatus according to claim 20, wherein the first device is an optical disc device and said second recording and reproducing device is a semiconductor disc device.

25. A data storage apparatus according to claim 20, wherein said interface controller issues to the host computer a command complete message after received data have been stored in the second recording and reproducing device and before transferred data have been stored in the first recording and reproducing device.

* * * * *